(No Model.) 2 Sheets—Sheet 1.
W. CORRY.
SAFE, VAULT, &c.
No. 434,503. Patented Aug. 19, 1890.
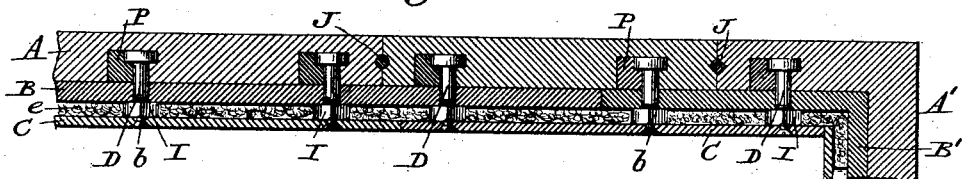
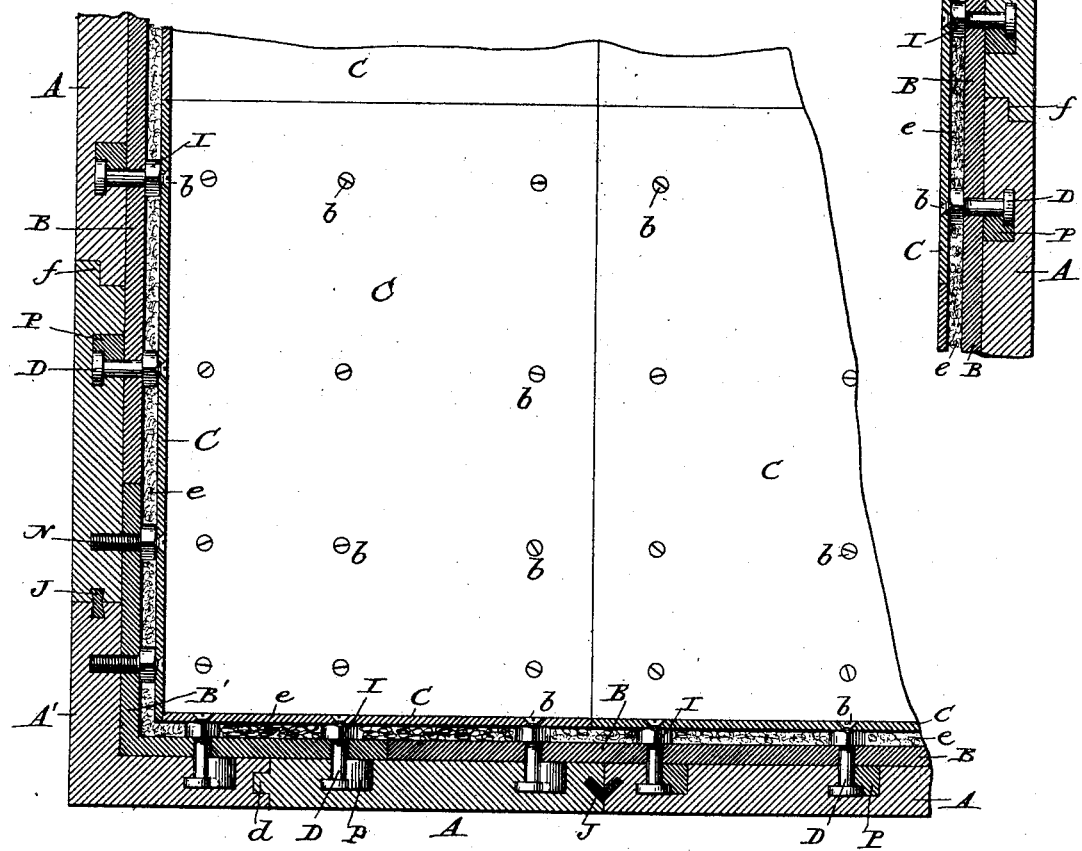
Attest,
Sidney P. Hollingsworth
Horace A. Dodge.
Inventor:
Wm Corry
by Dodge Sons
Attys
THE NORRIS PETERS CO., PHOTO-LITHO., WASHINGTON, D. C.

(No Model.) 2 Sheets—Sheet 2.

W. CORRY.
SAFE, VAULT, &c.

No. 434,503. Patented Aug. 19, 1890.

Attest,
Sidney P. Hollingsworth
Horace A. Dodge

Inventor,
Wm Corry
by Dodge Sons
Attys

UNITED STATES PATENT OFFICE.

WILLIAM CORRY, OF CINCINNATI, OHIO, ASSIGNOR TO HALL'S SAFE AND LOCK COMPANY OF OHIO.

SAFE, VAULT, &c.

SPECIFICATION forming part of Letters Patent No. 434,503, dated August 19, 1890.

Application filed May 12, 1890. Serial No. 351,387. (No model.)

*To all whom it may concern:*

Be it known that I, WILLIAM CORRY, a citizen of the United States, residing at Cincinnati, in the county of Hamilton and State of Ohio, have invented certain new and useful Improvements in Safes, Vaults, &c., of which the following is a specification.

My invention relates to safes, vaults, and similar structures; and the invention consists in a novel method or means of securing the parts comprising the structure, and in certain details of construction, as hereinafter more fully described.

Figure 1 represents a portion of the walls of a safe or vault built on my plan in a transverse or horizontal section. Fig. 2 is a similar view in vertical section, showing a portion of the side walls and of the bottom. Figs. 3, 4, 5, 6, and 7 are views showing the details of construction.

Figure 3:
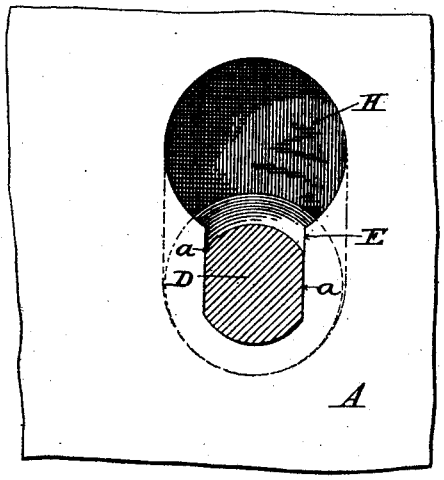
Figure 4:
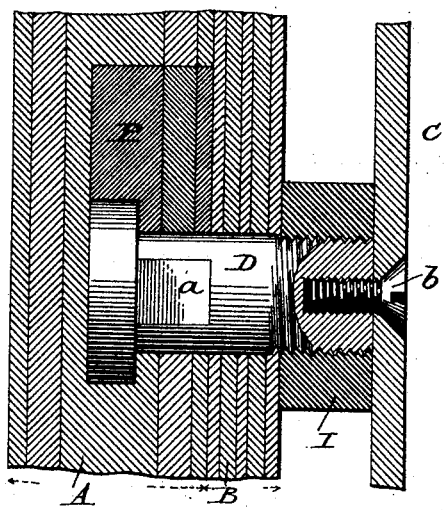
Figure 5:
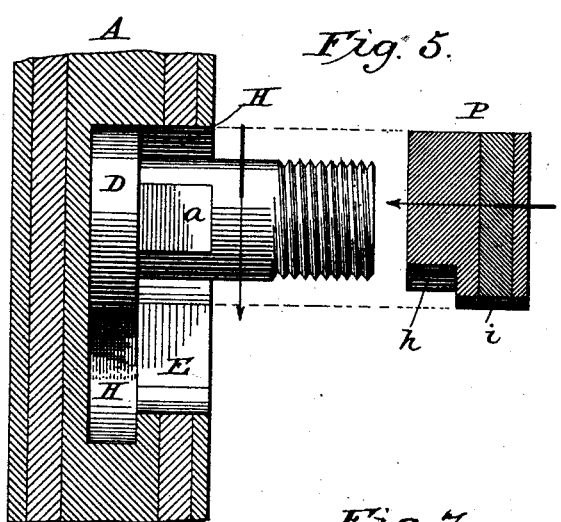
Figure 6:
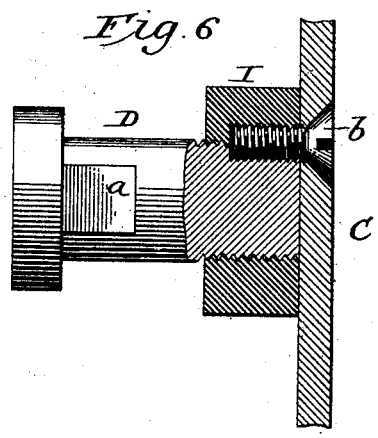
Figure 7:
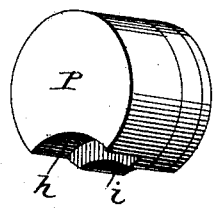

The object of this invention is to unite the plates composing the walls of safes, vaults, &c., in such a manner that the fastening bolts and devices cannot be got at from the exterior, or, if their location be ascertained, that they cannot be detached or displaced, and so as to have no hole or any bolt or rivet show on the exterior surface, thereby rendering the structure more secure against the attacks of burglars. To accomplish these results, I proceed as follows:

I construct the outer plate A, which is preferably composed of alternate layers of iron and steel welded together in a manner well known to the trade, and usually about one inch thick, of the proper size and shape, plane the edges, and fit them for the reception of dowels J of any preferred form in cross-section, of which several forms are shown in Figs. 1 and 2; or, if preferred, the joints may be made as shown at $d$ or at $f$, Fig. 2. I then provide a series of bolts D, constructed as shown in Figs. 4, 5, and 6—that is to say, they are strong heavy bolts, having a circular or other form of head, which projects laterally to form a strong annular flange, as shown, with a screw-thread at its opposite end to receive a nut I, as shown in Figs. 4 and 6. Two sides of these bolts, near their heads, are flattened, as shown at $a$, Figs. 4, 5, and 6, and which may be done by forging or by cutting away the metal on opposite sides, the object of which will be described farther on. I then, by means of a proper tool, cut in the inner face of the main or outside plates A a series of recesses H, of a size corresponding in diameter to that of the bolt-heads, as shown in Fig. 3, these holes or recesses extending about two-thirds of the way through the plates, and being located at such points as may be desired or necessary to insert the requisite number of the bolts, as indicated in Figs. 1 and 2. I then insert in these recesses or holes H a tool having a cutting-head which will cut a slot or groove of the same diameter as the hole H when moved sidewise, the shank of the tool at the same time cutting a slot E equal in width to the thickness of the bolt when measured crosswise from one or the other of its flat sides or faces $a$, as clearly shown in plan in Fig. 3 and in sectional elevation in Fig. 5, the dotted lines in Fig. 3 indicating the boundaries of the under-cut. By this means I form a groove or recess at one side of the hole H, into which the bolt can be shoved laterally after it has been inserted into the hole H, and that when thus moved laterally its head will engage under the solid overhanging flange which surrounds the slot E, while its flattened sides, bearing against the sides of the slot E, will prevent the bolt from being turned.

In Fig. 5 the bolt is shown set in the hole H preparatory to being moved laterally into the slot, and in Figs. 3 and 4 it is shown as having been moved into position in the slot where it is to remain. In order to lock these bolts in position and at the same time have no cavities left in the plates A, I provide a series of plugs P, one of which is shown detached and in perspective in Fig. 7. It is made preferably of the compound metal of the proper size to fill the hole H, it being cut away on one side, as at $h$ and $i$, so as to fit snugly against the head and shank of the bolt, it being shown in position alongside of the bolt in Fig. 4. It will readily be seen that by these means I provide the outer plates A with as many of these bolts as may be desired, that their heads are securely locked in the plate so that they cannot be driven out even if their location be ascertained by drilling or otherwise from the exterior, that they are locked in the slots so they cannot be turned to unscrew the nuts, and the exterior of the plates are left perfectly smooth and unbroken, there being no holes, bolt or rivet heads, or projections of any kind upon the outer surfaces of the plates, and nothing to indicate their locations to burglars or others operating from the outside. These bolts will be made longer or shorter, according to the number and thickness of the plates that it is desired to add on the inside, and to receive the nuts I. In the drawings I have shown three plates as being used—the thick outside plate A, in which the bolts are secured, and next to that another compound plate B, which of course is provided with holes corresponding with the position of the bolts D. After the plate B is placed in position the nuts I are put onto the projecting ends of the bolts D and screwed up tight, and then against the inner ends of the bolts and nuts I place a lining-plate C and secure it in place by means of screws b, which are tapped into the ends of the bolts, as shown in Fig. 4, or, if preferred, may be screwed into a hole in the nut or into a hole made partly in the bolt and partly in the nut, as shown in Fig. 6, these two latter plans at the same time serving to lock the nut so that it cannot be turned, even if a hole could be cut through the wall, so as to reach it with a tool from the outside.

In the manufacture of safes and vaults it is desirable to form the angles or corners of a solid plate bent to the proper angle, so as to have no joint at the corners, as shown in Figs. 1 and 2, in which A' indicates the exterior angle-plate and B' the interior angle-plate. It will be seen that after the outer plates have been put together the projecting ends of the bolts on one wall will stand at a right angle to those on the adjoining wall or side, and that therefore the inner angle-plates B' cannot be shoved onto the bolts which project from both walls. To obviate this difficulty I omit the bolts D on one wall as far as the inner angle-plate extends along that wall, and instead tap a series of bolt-holes in the inner face of the outer plates A, as shown at upper right-hand side of Fig. 1 and at the lower left-hand side of Fig. 2, in which bolts N are screwed to hold that side of the inner angle-plate B'.

It will be observed that as the lining-plate C rests against the inner ends of the bolts D and nuts I there will be a space left between the plates B and C just equal to the thickness of the nuts I, and that this space may be varied by varying the thickness of the nuts, as desired. This space I fill with mineral wool, asbestus, silicon, magnesia, or any similar material which is known to be a non-conductor of heat, thereby preventing the condensation of moisture, or what is ordinarily termed "sweating," on the interior plates.

In building up the corners of a safe or vault I reverse the angle-plates, so that in one angle the bolts N will come at one side of the corner and at the next angle the bolts N will be on the opposite side of the corner, and so on all around. It will be observed that the plugs P will be held firmly in place by the plate B, which is held firmly by the nuts I, and thus there is no cavity left in the plates A except the small V-shaped spaces at the sides between the edge of the bolt-head and the plug, as indicated by the dotted lines in Fig. 3, and these spaces may be filled by suitably-shaped pieces of solid metal of any kind preferred, or any of the known kinds of self-hardening metal may be used to fill these small spaces, it being poured in while in a molten or fluid condition.

While I have described the slots in which the bolts are secured as being formed at one operation by a single tool, it is of course obvious that they may be formed otherwise or by a series of tools, as is well understood by persons familiar with the art of metal working.

Having thus described my invention, what I claim is—

1. In a safe, vault, or similar structure, one or more plates A, provided on its interior with undercut recesses, having bolts D seated and held in said recesses by means of their heads, substantially as shown and described.

2. In combination with a plate A, having the undercut recess with its slot E, the headed bolt D, having its sides flattened, as described, whereby the bolt is prevented from being turned after it is placed in position.

3. In combination, the plate A, provided with the undercut recess, the headed or flanged bolt inserted in said recess with its shank resting in the slot thereof, and the plug P at the side of the bolt in said recess, substantially as and for the purpose set forth.

4. The combination, in a safe, vault, or similar structure, of a plate A, provided with the undercut recesses, the headed or flanged bolts set and held therein, a plate B, provided with holes corresponding to the position of the bolts, and nuts I, all arranged substantially as shown and described.

5. In combination with the plate A, provided with the undercut recesses, and having the headed or flanged bolts held therein and provided with nuts I at their inner ends, the lining-plate C, arranged and held in place by the screws b, substantially as shown and described.

6. In combination with the exterior angle-plate A', having bolts secured thereto at one side of the angle or corner and having screw-threaded holes at the opposite side, the interior angle-plate B', provided with suitable holes, and the screw-bolts N, for fastening the plates together, as herein described.

In witness whereof I hereunto set my hand in the presence of two witnesses.

WILLIAM CORRY.

Witnesses:
   Jas. D. Henry,
   Charles Bird.